United States Patent [19]
Magro

[11] Patent Number: 6,151,658
[45] Date of Patent: Nov. 21, 2000

[54] WRITE-BUFFER FIFO ARCHITECTURE WITH RANDOM ACCESS SNOOPING CAPABILITY

[75] Inventor: James R. Magro, Austin, Tex.

[73] Assignee: Advanced Micro Devices, Inc., Sunnyvale, Calif.

[21] Appl. No.: 09/008,394

[22] Filed: Jan. 16, 1998

[51] Int. Cl.[7] .................................................. G06F 13/00
[52] U.S. Cl. ........................... 711/110; 711/117; 711/154
[58] Field of Search ................................... 711/117, 110, 711/154, 108

[56] References Cited

U.S. PATENT DOCUMENTS

| | | | |
|---|---|---|---|
| 4,538,226 | 8/1985 | Hori | 711/3 |
| 4,750,154 | 6/1988 | Lefsky et al. | 365/189.04 |
| 4,959,771 | 9/1990 | Ardini, Jr. et al. | 711/136 |
| 5,299,147 | 3/1994 | Holst | 365/49 |
| 5,329,405 | 7/1994 | Hou et al. | 707/6 |
| 5,517,660 | 5/1996 | Rosich | 711/117 |
| 5,627,993 | 5/1997 | Abato et al. | 711/143 |

FOREIGN PATENT DOCUMENTS

WO 94/11828  5/1994  European Pat. Off. .

OTHER PUBLICATIONS

*AMD–640 System Controller Data Sheet*, Advanced Micro Devices, Inc., © 1997, pp. 2–1 through 2–4, 5–1 through 5–3, 5–11, and 5–32.

*Motorola Semiconductor Technical Data*, Motorola, Inc., Doc. No. MCM69C432, Rev. 2, Sep. 15, 1997, pp. 1–20.

*Primary Examiner*—David L. Robertson
*Attorney, Agent, or Firm*—Fletcher, Yoder & Van Someren

[57] ABSTRACT

A system provides a write buffer with random access snooping capability. A random access write buffer includes a write buffer controller and a random access memory (RAM) containing a content addressable memory (CAM) address store and a random access memory data store. The CAM compares an input write address from a producer to the addresses present in the address store. If the input write address is "related" to an address present in the address store, the CAM detects an address hit. The indication of an address hit is provided to the write buffer controller which signals the data store to store the input write data in the existing rank of the data store associated with the "related" address detected by the CAM. The CAM also detects whether an input read address provided by a producer to a consumer is "related" to an address in the address store. If the input read address is "related" to an address in the address store, the read data at the "related" address in the address store is retrieved and merged with the read data from the consumer to produce valid read data. The valid read data is then provided to the producer. The write buffer thus enhances a general FIFO function with write merging, write collapsing, and read merging.

20 Claims, 10 Drawing Sheets

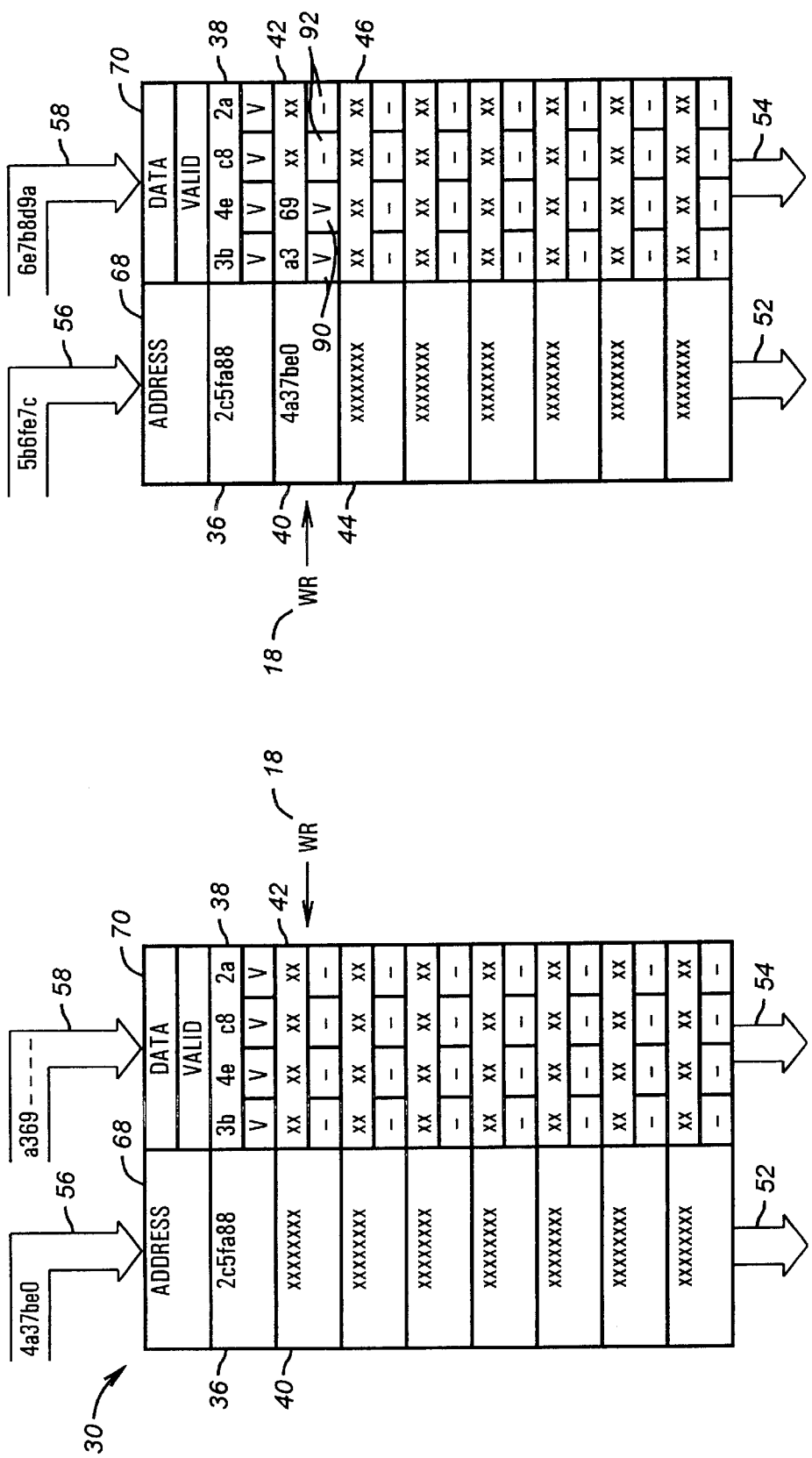

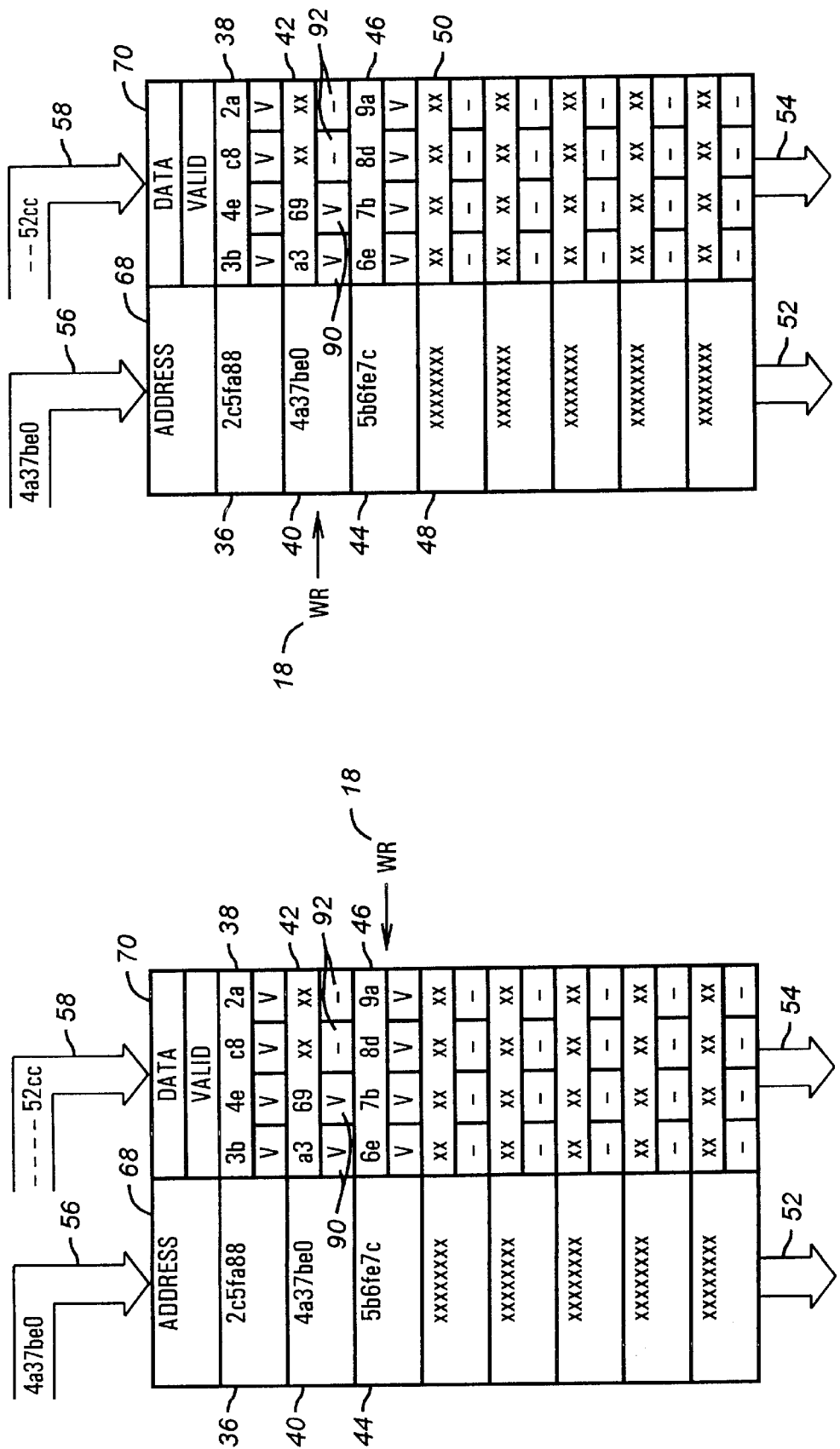

WRITE-BUFFER FIFO ARCHITECTURE WITH RANDOM ACCESS SNOOPING CAPABILITY

BACKGROUND OF THE INVENTION

1. Field of the Invention

The present invention relates to a write buffer FIFO architecture, and more particularly to a write buffer FIFO architecture with random access snooping capability.

2. Description of the Related Art

Write buffers are used within systems to provide temporary storage for write data. A write buffer is conceptually a FIFO (First-In-First-Out) device where data is posted at a front end of the FIFO and is retrieved from a back end of the FIFO. Data "marches" through a FIFO and emerges or is read from the back end of the FIFO in the strict ordering in which the data is written into the front end of the FIFO. A FIFO implemented as "circular queue" with dual ported random access memory (RAM), generally includes a read pointer which points to the "next" location or rank in the FIFO where data is to be read and a write pointer which points to the "next" rank in the FIFO where data is to be written. The write pointer is used by the front end logic of the FIFO to address a rank where data is to be written into the FIFO, and the read pointer is used by the back end logic of the FIFO to address a rank where data is to be retrieved from the FIFO. A device which may be termed a "producer" sends write data to the FIFO location corresponding to the write pointer, and a device which may be termed a "consumer" retrieves write data from the FIFO location corresponding to the read pointer. In most systems, a processor or bus master serves as the "producer" and a memory device, peripheral device, memory bus, or peripheral bus serves as the "consumer."

The general FIFO function of posting, buffering, and retrieving write data provided by conventional write buffer FIFOs can be inefficient when a write cycle is used to post write data to an address "related" to an address for which write data was previously posted. An address is "related" to an address for which write data was previously posted if an address is the same or contiguous with the address for which write data was previously posted such that data for both addresses is capable of storage in a single rank. A rank is a unit or space of a write buffer FIFO used for data or address storage. A write buffer FIFO typically includes a plurality of ranks for data storage and a plurality of ranks for address storage. For a write cycle of a conventional write buffer FIFO, a new rank is allocated and new write data is posted to the new rank. The new write data, however, may be provided for an address "related" to an address for which write data is already stored in an existing rank. This event occurs when data was previously posted for an address "related" to the address provided for the new write data. Multiple write cycles thus may be used to post write data associated with "related" addresses to multiple ranks. Since a FIFO has a limited number of ranks, each rank constitutes valuable FIFO space.

The conventional write buffer FIFO approach of allowing write data for "related" addresses to be spread across multiple ranks requires multiple read cycles to retrieve the write data for "related" addresses. For each read cycle, write data is retrieved from a single rank. Multiple read cycles therefore may be required to fully retrieve write data even for "related" addresses. If the multiple ranks containing write data for "related" addresses are interleaved with ranks containing write data for other addresses, it has been necessary to retrieve write data for "related" addresses as well as the data for other addresses from the interleaved ranks due to the strict ordering in which write data is retrieved from a conventional write buffer FIFO. Speed is an important concern in retrieving FIFO data. For a conventional write buffer FIFO, the need to execute multiple read cycles to retrieve write data for "related" addresses thus extends the time for retrieving FIFO data for "related" addresses.

Further, to maintain data coherency, it has been necessary to flush (or empty) the data stored in a conventional write buffer to the consumer (e.g., a memory device) before servicing a read request of a consumer address that also is "related" to an address held in the buffer address store. Flushing of the write buffer ensures that the most recent data is written to the consumer before the consumer responds to the read request. Thus, read requests which involve an address related to an address in the buffer are delayed.

SUMMARY OF THE INVENTION

Briefly, a system according to the present invention provides a write buffer with random access snooping capability supporting write merging, write collapsing, and read merging. The write buffer includes a write buffer controller and a random access memory containing a content addressable memory address store capable of random read or write access and a random access memory data store. A producer provides the address store with an input write address and provides the data store with input write data. The content addressable memory concurrently compares the input write address to the addresses present in the address store. If the input write address is "related" to an address present in the address store, the content addressable memory detects an address hit. The indication of an address hit is produced to the write buffer controller which signals the data store to store the input write data in the rank of the data store associated with the "related" address detected by the content addressable memory. If the input write data does not overlap the valid portion of the data previously stored in the rank associated with the "related" address, the store operation results in write merging. If the input write data overlaps the valid portion of the data previously stored in the rank associated with the rank associated with the "related" address, the store operation results in write collapsing. The write buffer thus eliminates the need to allocate a new rank to store write data when an input write address is "related" to an address present in the address store. By storing write data for "related" addresses in a single rank rather than multiple ranks, the write buffer provides efficient storage of write data for "related" addresses. By eliminating the use of multiple ranks for storing write data for "related" addresses, the write buffer also reduces the number of read cycles for retrieving write data for "related" addresses going to a consumer.

In addition, the content addressable memory detects whether an input read address provided by a producer to a consumer is "related" to an address in the address store. If the input read address is "related" to an address in the address store, the valid write data in the data store associated with the "related" address is merged with data from the consumer associated with the input read address, thereby resulting in read merging. The merged data preserves read data coherency by reflecting both the most recent write data in the write buffer and the read data in the consumer. With this read merge function, a write buffer need not be emptied before a read is performed from the consumer. A buffer with random access snooping capability thus significantly improves the method of posting and retrieving data for a write buffer by supporting write merging, write collapsing, and read merging.

BRIEF DESCRIPTION OF THE DRAWINGS

A better understanding of the present invention can be obtained when the following detailed description of the preferred embodiment is considered in conjunction with the following drawings, in which:

FIGS. 3A–3E are schematic illustrations depicting stages of the random access snooping write buffer of FIG. 2 for write merging in accordance with the present invention;

DETAILED DESCRIPTION OF PREFERRED EMBODIMENT

Figure 1:
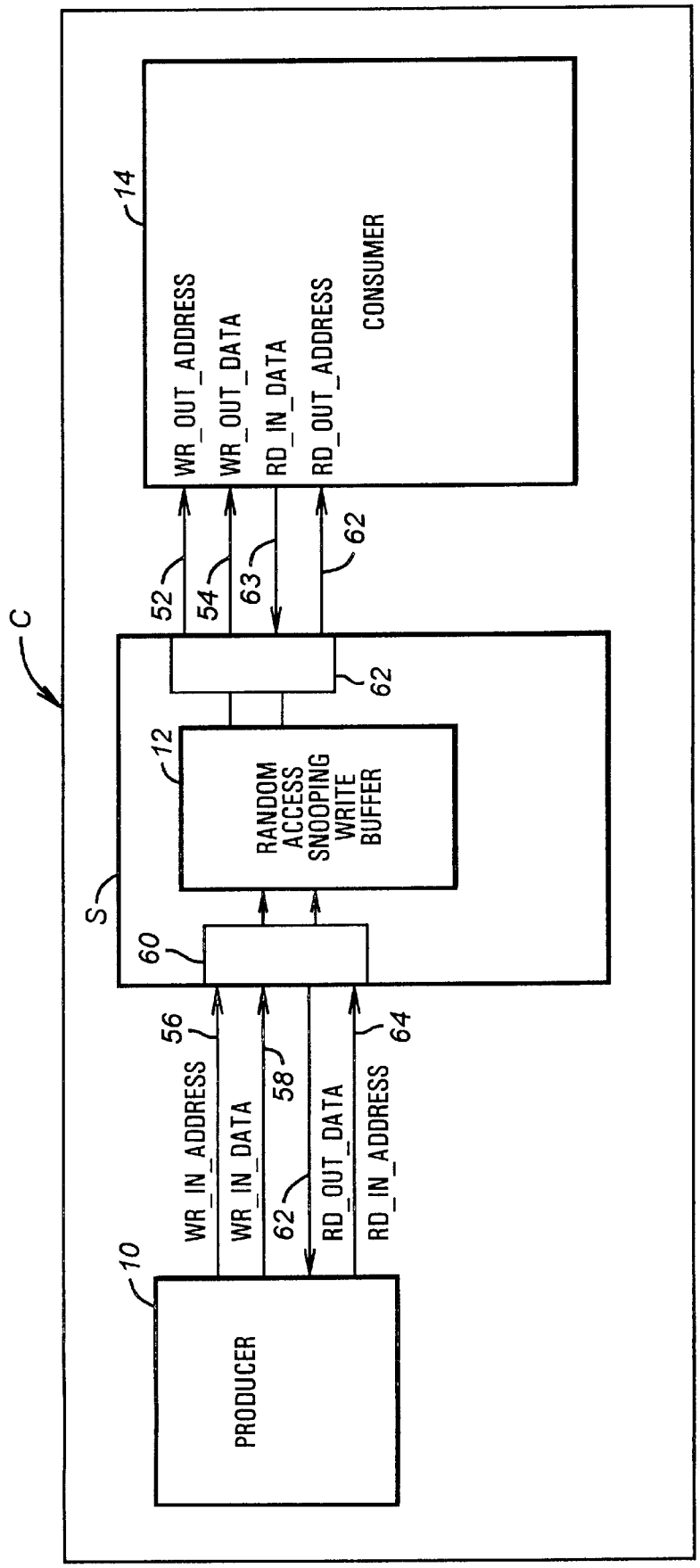
FIG. 1 is a schematic diagram of a system with a system controller including a random access snooping write buffer of the present invention.

Turning now the drawings, FIG. 1 shows a system C with a system controller S including a random access snooping write buffer 12 according to the present invention. The system controller S may provide a single snooping write buffer 12 or a plurality of snooping write buffers 12. The snooping write buffer 12 allows for specialized posting and retrieving of write data. In posting write data to the snooping write buffer 12, a "producer" 10 within the system C provides an input write address 56 and input write data 58 through a producer interface 60 (typically a bus) to the snooping write buffer 12. In retrieving write data from the snooping write buffer 12, the snooping write buffer 12 provides a write address 52 and write data 54 through a consumer interface 62 (typically a bus) to a "consumer" 14 within the system C. The "producer" 10 is a master device for providing data to the slave device or "consumer" 14. For example, the "producer" 10 may be a processor or bus master, and the "consumer" 14 may be a memory device, a peripheral device, a memory bus, or a peripheral bus. More specific paired examples of a "producer" and "consumer" include (i) a dynamic random access memory (DRAM) controller and a DRAM, (ii) a processor and a DRAM, (iii) a processor and a Peripheral Component Interconnect (PCI) bus, and (iv) a PCI master and a DRAM. It should be understood that these examples are not exhaustive. Further, certain components of the system C which are not necessary to gain a full understanding of the present invention have been omitted for clarity.

The system controller S is a controller for a processor-based system or sub-system which uses write buffering to minimize access time for writing data to a "consumer" 14. For certain processor-based systems, the system controller S may be an embedded microcontroller. It should be understood that multiple "producers" within the system C may be capable of posting write data to a plurality of snooping write buffers 12 for the "consumer" 14, and that multiple "consumers" within the system C may be capable of retrieving write data from a plurality of snooping write buffers 12. It should also be understood that certain components of the system controller S which are not necessary to gain a full understanding of the present invention have been omitted.

Figure 2:
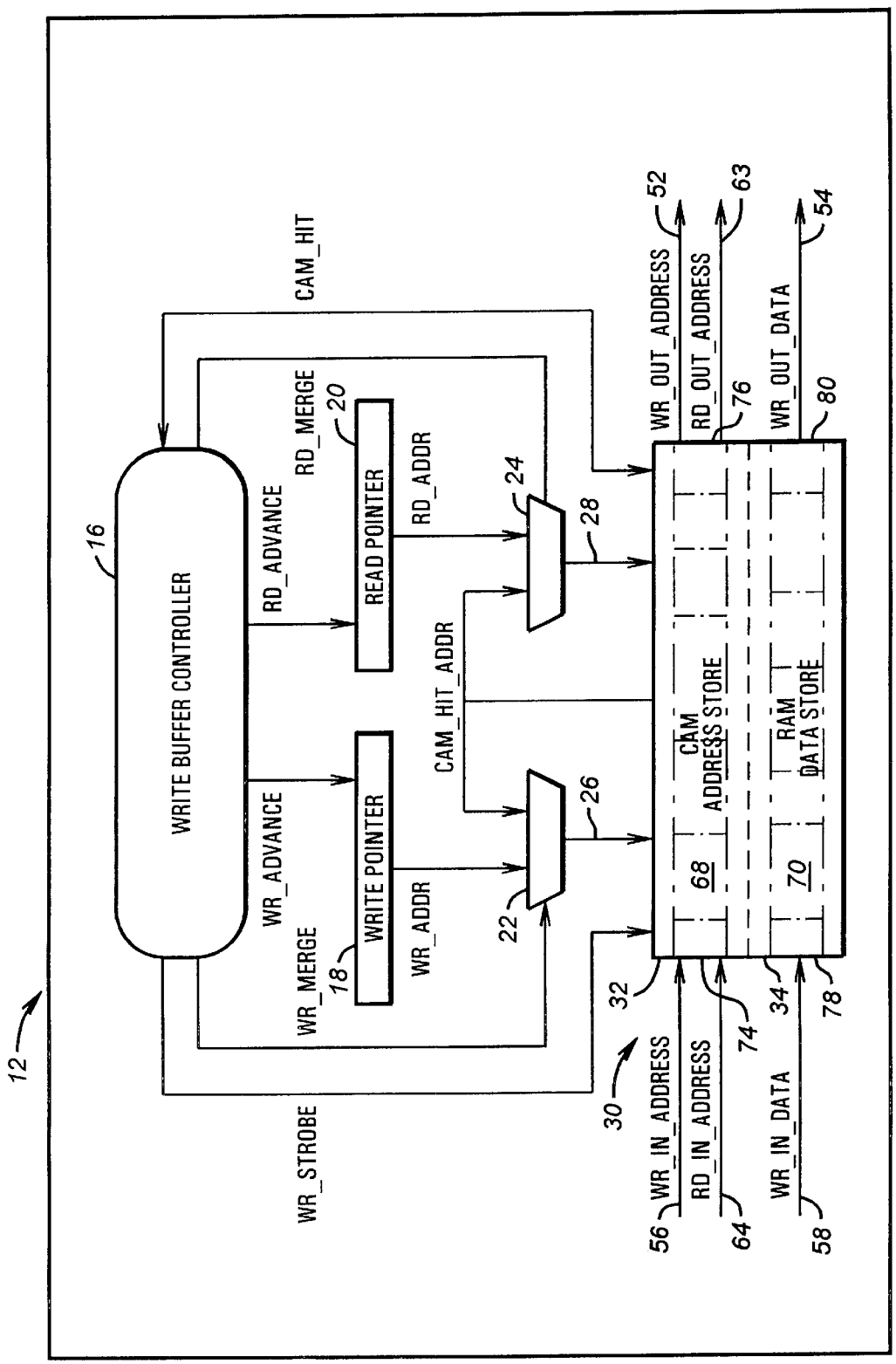
FIG. 2 is a schematic diagram of an embodiment of the random access snooping write buffer of FIG. 1.

Referring to FIG. 2, an embodiment of the random access snooping write buffer 12 of the present invention is shown. The write buffer 12 provides a unique write buffer FIFO (First-In-First-Out) architecture for supporting write merging, write collapsing, and read merging. For the illustrated embodiment, the write buffer FIFO architecture of the present invention is an enhancement of a write buffer circular queue FIFO architecture. Accordingly, the disclosed write buffer FIFO is implemented as a circular queue. It is contemplated that a write buffer FIFO architecture according to the present invention may be used to enhance other types of write buffer FIFO architectures.

The general FIFO functions of posting, buffering, and retrieving data provided by conventional write buffer FIFOs has been somewhat inefficient when a write cycle is used to post write data to an address "related" to an address for which write data was previously posted. An address is "related" to an address for which write data was previously posted if an address is the same or contiguous with the address for which write data was previously posted such that write data for both addresses is capable of storage in a single rank of a write buffer. In the case of an Am486 processor scheme, for example, address lines A31–A2 correspond to the 30 high order address bits, while the two least significant address bits are addressed by byte enables BE3-0#. In this scheme, an address is "related" if the address lines (i.e. A[31:2]) are the same, even if some of the byte enables are different. For a write cycle of a conventional write buffer FIFO, a new rank is allocated and new write data is posted to the new rank. The new write data, however, may be provided for an address "related" to an address for which write data is already stored in an existing rank. This event occurs when data was previously posted for an address "related" to an address provided with the new write data. It should be understood that this event may occur for a write buffer of any width and is not specific to a DWORD width write buffer. Multiple write cycles thus have been used to post write data associated with "related" addresses to multiple ranks. Since a FIFO provides a limited number of ranks, each rank constitutes valuable FIFO space.

Using the Am486 addressing scheme, for example, data written at an address A[31:2]=0 and BE[3:0]={0,0,1,1} would be held in a different rank from A[31:2]=0 and BE[3:0]={1,1,0,0}. This conventional write buffer FIFO approach of allowing write data for "related" addresses to be spread across multiple ranks has required multiple read cycles to retrieve write data for "related" addresses in a conventional write buffer FIFO. For each read cycle, write data is retrieved from a single rank. Multiple read cycles therefore have been required to fully retrieve write data for "related" addresses in a conventional write buffer FIFO. If the multiple ranks containing data for "related" addresses are interleaved with ranks containing write data for other addresses, it has been necessary to retrieve write data for the "related" addresses as well as the write data for other addresses from the interleaved ranks due to the strict ordering in which data is retrieved from a conventional write buffer FIFO. Speed is an important concern in retrieving FIFO data. For a conventional write buffer FIFO, the need to execute multiple read cycles to retrieve write data for "related" addresses has extended the time for retrieving FIFO data for "related" addresses.

A system according to the present invention addresses these issues by providing a write buffer 12 with snooping capability. Returning to FIG. 2, the snooping write buffer embodiment 12 includes a write buffer controller 16, a write pointer 18, a read pointer 20, a write address switch 22, a read address switch 24, and a random access memory 30 including a content addressable memory address store 32 and a random access memory data store 34. The write buffer controller 16 controls the operation of the snooping write buffer 12. The write buffer controller 16 may be implemented as a single integrated controller or a plurality of controllers with each controller regulating a particular structure within the snooping write buffer 12. For example, the write buffer controller 16 may include a write buffer load controller, a write buffer fetch controller, a write buffer read pointer controller, and a write buffer write pointer controller. The write buffer controller 16 uses a WR_ADVANCE signal to advance the write pointer 18 and uses a RD_ADVANCE signal to advance the read pointer 20.

A content addressable memory, also known as associative memory, is a specialized memory allowing for a fast comparison between an address supplied by a requesting master and addresses existing in the content addressable memory. It should be understood that the address store 32 may include typical components of a content addressable memory such as a mask register, input register, output register, a storage cell array, match circuitry, and select circuitry. Match circuitry is typically implemented but not restricted to using exclusive-nor gates, with each bit of input data for comparison being paired with a bit of the memory element. Design and operation of a content addressable memory is understood in the art. In the disclosed embodiment, an encoder (not shown) of the address store 32 is used to generate the CAM_HIT_ADDR signal for identifying a rank address of the address store containing an address "related" to an input address. Further, in the disclosed embodiment, the random access memory 30 may include a full address rank (not shown) including the address tag or write address, byte enable bits for determining the validity of the bytes in the data store 34, an address tag valid bit to reflect the validity of the address tag, and bits used for debugging the snooping write buffer 12. Of these various fields, only the address tag which constitutes the address rank for the address array 68 is preferably implemented as content addressable memory. Further, it should be understood that a dedicated valid bit or byte enable bits may be used for excluding an address entry from the compare operation.

The data store 34 of the snooping write buffer 12 includes a set of ranks 70 shown in dashed and dotted lines for storing write data, and the address store 32 of the snooping write buffer 12 includes a set of ranks 68 shown in dashed and dotted lines for storing write data addresses. The set of ranks within the data store 34 serves as an data array, and the set of ranks within the address store 32 serves as an address array. Each rank in the data store 34 for storing write data is associated with a rank in the address store 32 for storing a write address or address tag. A write address in a rank of the address store 32 is the address for the location in the consumer 14 where the write data in the associated rank of the data store 34 is to be provided. Each rank in the address store 32 thus corresponds 1 for 1 to a rank in the data store 34. The read pointer 20 points to the "next" rank in the data store 34 where previously written data is to be read, and the write pointer 18 points to the "next" rank in the data store 34 where write data is to be written. In the disclosed embodiment, the write pointer 18 and read pointer 20 are implemented as counters. Also, in the disclosed embodiment, the data store 34 is a dual ported static RAM with the ability to handle concurrent read and write accesses to the data store 34, and the address store 32 is a dual ported static CAM with the ability to handle concurrent read and write accesses to the address store 32. The address store 32 and data store 34 of the random access memory 30 may include an address and data posting latch (not shown) for storing an address, byte enables and data retrieved from the write buffer 12. For the consumer 14, this latch is used to prevent stalling the producer 10 should a rank attempt to be written as it is being read out for the consumer 14.

The write address switch 22 provides an address signal 26 to the address store 32 and data store 34 to select the "next" rank where input write data and address is to be stored, and the read address switch 24 provides an address signal 28 to the address store 32 and data store 34 to select the "next" rank where previously written write data is to be read. The input signals to the write address switch 22 include a WR_ADDR signal from the write pointer 18 providing a rank address within the address store 32 and data store 34 for the next contiguous rank and a CAM_HIT_ADDRESS signal for providing a rank address within the address store 32 and data store 34 for a rank storing a write address "related" to the input write address if such a rank exists. A first address is "related" to a second address if the addresses are the same as or contiguous with one another such that data for both addresses is capable of storage in a single rank of the data store 34. If the addresses are not contiguous such that data for both addresses is not capable of storage in a single rank of the data store 34, then the addresses are deemed "unrelated."

The write address switch 22 is controlled by a WR_MERGE signal from the write buffer controller 16. The state of the WR_MERGE signal is based on the state of a CAM_HIT signal provided by the address store 32 to the write buffer controller 16. If an address "related" to the input write address 56 is present in the address store 32, then the CAM_HIT signal is asserted indicating an address match or hit. If the CAM_HIT signal is asserted, then the write buffer controller 16 asserts the WR_MERGE signal provided to the write address switch 22. If the WR_MERGE signal is asserted at the write address switch 22, the write address switch 22 provides a CAM_HIT_ADDR signal to the address store 32 and data store 34. It should be understood that the WR_MERGE signal is active for a write merge in accordance with the present invention and a write collapse in accordance with the present invention. The CAM_HIT_ADDR signal provides the rank address for a rank containing a write address in the address store 32 and associated data in the data store 34 "related" to the input write address 56 if such a rank address exists. If the CAM_HIT signal is asserted, then the write buffer controller 16 asserts the WR_MERGE signal, thus switching the address switch 22 to provide the CAM_HIT_ADDR signal. By providing the CAM_HIT_ADDR signal, an input write address 56 from a producer "related" to existing write addresses in the snooping write buffer 12 may be stored in an existing rank in the address store 32 and the associated data input WR_IN_DATA 58 is stored to an existing rank in the data store 34.

If the addresses within the address store 32 are "unrelated" to the input write address, then the CAM_HIT signal is deasserted indicating an address mismatch or miss. If the CAM_HIT signal is deasserted, then the write buffer controller 16 deasserts the WR_MERGE signal provided to the write address switch 22. If the WR_MERGE signal is deasserted at the write address switch 22, the write address switch 22 provides the WR_ADDR signal to the address store 32 and data store 34. Also, if the CAM_HIT signal is deasserted, then the write buffer controller 16 advances the write pointer 18 to the next contiguous rank address.

The input signals to the read address switch 24 include a READ_ADDR signal providing a rank address within the address store 32 for the next contiguous rank from the read pointer 20 and a CAM_HIT_ADDRESS signal for providing an address within the address store 32 for a rank containing a write address "related" to the input read address 64 (FIGS. 5A–5B) if such a rank address exists. It should be understood that the WR_IN_ADDRESS signal and RD_IN_ADDRESS signal may constitute the same bus. The read address switch 24 is controlled by a RD_MERGE signal from the write buffer controller 16. The state of the RD_MERGE signal is based on the state of the CAM_HIT signal provided by the address store 32 to the write buffer controller 16.

If an address "related" to the input read address 64 is present in the address store 32, then the CAM_HIT signal is asserted indicating an address match or hit. If the CAM_HIT signal is asserted, then the write buffer controller 16 asserts the RD_MERGE signal provided to the read address switch 24. If the RD_MERGE signal is asserted at the read address switch 24, the read address switch 22 provides a CAM_HIT_ADDR signal to the data store 34 and address store 32. The CAM_HIT_ADDR signal provides a rank address within the address store 32 for a rank containing a write address "related" to the input read address 64 if such a rank address exists. The CAM_HIT_ADDR signal, for example, may be used to retrieve byte enables which indicate the rank address of the data to be merged. If the CAM_HIT signal is asserted, then the write buffer controller 16 asserts the RD_MERGE signal, thus switching the address switch 24 to provide the CAM_HIT_ADDR signal. By providing the CAM_HIT_ADDR signal, a write data address in the address store 32 "related" to an input read address may be retrieved from the data store 34. The retrieved data may then be merged with data from the consumer 14 associated with the input read address 64 to provide coherent data to the producer 10.

If the addresses within the address store 32 are "unrelated" to the input read address, then the CAM_HIT signal is deasserted indicating an address mismatch or miss. If the CAM_HIT signal is deasserted, then the write buffer controller 16 deasserts the RD_MERGE signal provided to the read address switch 24. If the RD_MERGE signal is deasserted at the read address switch 24, the read address switch 24 provides the RD_ADDR signal to the address store 32 and data store 34. In the disclosed embodiment, the read address switch 24 and write address switch 22 are implemented as multiplexers. The write buffer controller 16 advances the read pointer 20 after data is placed in the posting latch (not shown) which is going to the consumer 14. If the producer read cycle results in a write buffer "miss" then the consumer 14 supplies the data and the write buffer read merge does not take place, since the consumer 14 has the most recent data.

Further, the write buffer controller 16 controls posting of input addresses associated with write data through a WR_STROBE signal. The address bus WR_IN_ADDRESS 15 is connected to the input lines of the memory cells for storage into the CAM. The WR_IN_ADDRESS signal is written into the CAM memory cells on an active WR_STROBE signal. The address bus 15 is also connected to a CAM query side of the CAM so that an address driven onto the bus 15 may be compared with the contents already stored in the memory cells. For a read, the CAM does not latch an address, the RD_IN_ADDRESS signal, into a memory cell. In this case, the WR_STROBE signal is not active because the cycle is a read cycle. An address, however, is still used for the CAM query to detect if there is an address already in the CAM that matches an address presented by the producer 10.

An input address enters the address store 32 through an address port 74. Alternatively, instead of a WR_IN_ADDRESS signal and a RD_IN_ADDRESS signal, the write buffer 12 may receive an ADDRESS signal for a read or write operation. For a read operation, the ADDRESS signal is provided to both the write buffer 12 and the consumer 14. A write address exits the address store 32 through an address port 76 as a WR_OUT_ADDRESS signal. A read address exits the address store 32 through the address port 76 as a RD_OUT_ADDRESS signal. Alternatively, the write buffer 12 may prove a WRITE_BUFFER_ADDRESS signal to the consumer 14, the consumer 14 including a multiplexer for selecting either a producer address or the WRITE_BUFFER_ADDRESS signal carrying a write buffer address. Each rank of the address array 68 is coupled to a common address bus (not shown). Inputs to memory cells of the CAM share the same memory bus and, outputs from the memory cells of the CAM share the same bus allowing for random access capability for write buffer data and addresses. Random access capability allows a write address to be stored or retrieved from any rank in the address array 68.

Write data from a producer 10 enters the data array 70 through a data port 78 as a WR_IN_DATA signal WR_IN_DATA is latched into the data store 37 when the WR_STROBE signal is active. Write data exits the data array 70 through a data port 80 as a WR_OUT_DATA signal. Each rank of the data array 70 is coupled to a common data bus (not shown). Random access capability allows write data to be posted or retrieved from any rank in the data array 70 or address array 68. It should be understood that the data store 34 may include typical components of a random access memory. In addition, the snooping write buffer 12 may include configuration registers (not shown) for configuring the system modes in which the write buffer 12 is enabled and to define address regions in the system C as bufferable or non-bufferable.

Figure 3E:
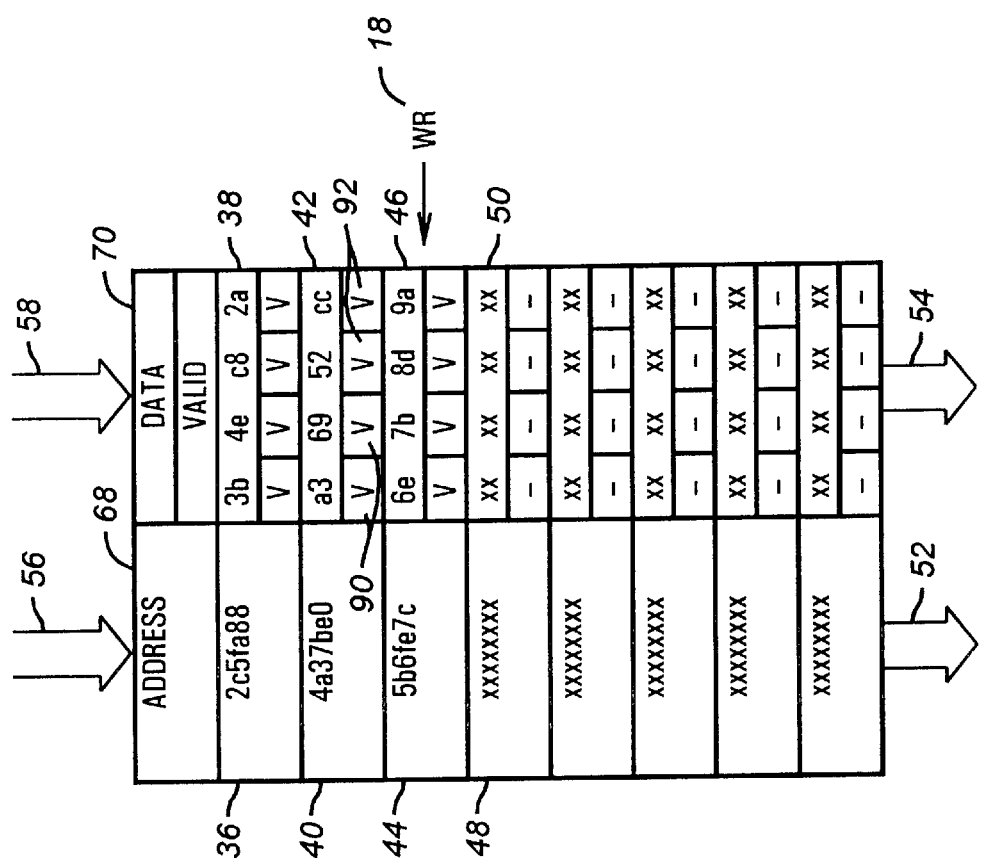

Referring to FIGS. 3A–3E, exemplary illustrations depicting stages of the write snooping buffer 12 showing write merging in accordance with the present invention are shown. Turning to FIG. 3A, an address rank 36 of the address array 68 is storing a write address '2c5fa88' and a data rank 38 of the data array 70 is storing write data '3b4ec82a'. FIG. 3A also shows the producer 10 presenting a new write address 56 of '4a37be0' to the address array 68 with new input write data 58 of 'a369 - - - ' to the data array 70. A '-' represents don't care data. It will be understood that in the Am486 addressing scheme, for example, the reason this data is "don't care" data is that corresponding ones of the byte enables BE3-0# are deasserted. The write pointer 18 is pointing to the address rank 36 and the data rank 38.

Referring to FIG. 3B, a stage of the random access memory 30 a single write cycle after the stage of FIG. 3A is shown. In that write cycle, the write address '4a37be0' was written into the address rank 40, the next contiguous rank after the address rank that was pointed to by the write pointer 18 in FIG. 3A. Also, in that write cycle, the write data 'a369 - - - ' was written into the data rank 42, the next contiguous rank after the data rank that was pointed to by the write pointer 18 in FIG. 3A. For data ranking 42, write data 'a369' represents valid data, and write data 'XXXX' represents invalid data. Valid bits 90 corresponding to 'a369' are in a valid state, and valid bits 92 corresponding to 'XXXX' are in an invalid state. Again, in the Am486 addressing scheme, for example, these valid bits are set according to the states of the byte enables BE3-0#. FIG. 3B also shows the producer 10 presenting a new write address 56 of '5b6fe7c' to the address array 68 with new input write data 58 of '6e7b8d9a' to the data array 70. Before writing the write address '4a37be0' to address rank 40 and write data 'a369 - - -' to data rank 42, in accordance with the present invention, the address '4a37be0' was concurrently compared to the write addresses stored in the address array 68 to detect if an address "related" to the write address '4a37be0' was present in the address array 68. It should be understood that a concurrent compare operation in accordance with the present invention may include comparing each bit or selective bits of an input write address with each bit or selective bits of write address stored in the address array 68. In the disclosed embodiment, address bits A31 through A2 of a 32-bit address bus are compared for an input address and a stored write address. The two lowest order bits on the address bus, A1 and A0, serve as byte enable bits. Since the stored write address '2c5fa88' was "unrelated" to the write address '4a37be0', the CAM_HIT signal was deasserted indicating an address miss. In response to the deasserted CAM_HIT signal, the write buffer controller 16 deasserted the WR_MERGE signal. In response to the deasserted WR_MERGE signal, the write address switch 22 provided the WR_ADDR signal to the address store 32. The WR_ADDR signal represents the next contiguous rank address which in this case was address rank 40 and data rank 42.

Referring to FIG. 3C, a stage of the random access memory 30 a single write cycle after the stage of FIG. 3B is shown. In that write cycle, the write address '5b6fe7c' was written into address rank 44, the next contiguous rank after the address rank pointed to by the write pointer 18 in FIG. 3B. FIG. 3C also shows the producer 10 presenting a new write address 56 of a '4a37be0' to the address array 68 with new input write data 58 of ' - - - 52cc' to the data array 70. Before writing the write address '5b6fe7c' to address rank 44 and write data 'a369 - - -' to data rank 42, the write address '5b6fe7c' was concurrently compared to the write addresses stored in the address array 68 to detect if an address "related" to the write address '5b6fe7c' was present in the address array 68. Since the write address '5b6fe7c0' was "unrelated" to the write addresses '2c5fa88' and '4a37be0', the CAM_HIT signal was deasserted indicating an address miss. In response to the deasserted CAM_HIT signal, the write buffer controller 16 deasserts the WR_MERGE signal. In response to the deasserted WR_MERGE signal, the write address switch 2 provided the WR_ADDR signal. The WR_ADDR signal represents the next contiguous rank address which in this case was for address rank 44 and data rank 46.

Referring to FIG. 3D, a stage of the random access memory 30 after the stage of FIG. 3C is shown. In this stage, the write address '4a37be0' is concurrently compared to the write addresses stored in the address array 68 to detect if an address "related" to the write address '4a37be0' is present in the address array 68. The write address '4a37be0' is related to the write address '4a37be0' stored in the address rank 40 since the addresses are contiguous such that data for both addresses may be stored in a single rank. In the disclosed embodiment, bits A31–A2 of both addresses are compared. If this portion of addresses are the same data for both addresses may be stored in a single rank,—the only difference in the addresses would be the byte enable status. Since a "related" address is present in the address array 68, the CAM_HIT signal is asserted indicating an address hit or match. In response to the asserted CAM_HIT signal, the write buffer controller 16 asserted the WR_MERGE signal. In response to the WR_MERGE signal, the write address switch 22 provides the CAM_HIT_ADDR signal to the address store 32 and data store 34. The CAM_HIT_ADDR signal represents the rank address corresponding to the detected "related" address. The rank address in this case is for address rank 40 and data rank 42. The write pointer 26 (output of switch 22) provides an address to any allocated address rank and data rank in the random access snooping write buffer 12 corresponding to a write address "related" to the input write address 56. The allocated address and data ranks in the snooping write buffer 12 are those ranks pointed to by the read pointer 20 and the ranks between the read pointer 20 and the write pointer 18. The rank pointed to by the write pointer 18 is not allocated since the write pointer 18 points to the "next" space to potentially write into.

Referring to FIG. 3E, a stage of the random access memory 30 following the stage of FIG. 3D is shown. In this stage, the write addresses '4a37be0' is stored in address rank 40 and the write data ' - - - 52cc' is merged with the write data 'a369 - - -' already stored in the data rank 42 producing the write data 'a36952cc'. Since invalid data was replaced with valid data '52cc,' the valid bits corresponding to write data '52cc' are switched to a valid state from an invalid state. By write merging data for "related" addresses using the random access snooping write buffer 12, a savings in FIFO space is achieved. For this particular example, there is a 2:1 savings since two ranks would be necessary to post write data 'a369 - - -" and write data ' - - - 52cc' with a conventional write buffer. In accordance with the present invention, the write data is posted to a single rank. The savings in FIFO space through write merging is a function of the size of the write data posted for "related" addresses. For example, if a rank is the size of a doubleword, four write cycles may be used to post write data to a single rank if the write data posted for each write cycle is the size of a byte and is non-overlapping. In accordance with the present invention, this example results in a 4:1 savings in FIFO space. It should be understood that a write data location of smaller size than a rank may be individually addressable. Write merging using the random access snooping write buffer 12 also reduces the number of read cycles for retrieving write data for "related" addresses.

In addition, storing write data for "related" addresses across multiple ranks in a conventional write buffer FIFO scatters write traffic. Storing write data for "related" addresses to a single rank in accordance with the present invention, however, consolidates write traffic. Further, splitting "related" addresses across multiple ranks in a conventional write buffer FIFO under-utilizes a write buffer rank. For example, if a write buffer rank has a four byte size, consecutive single byte transfers result in four write buffer ranks with only one byte of each rank storing a byte a data. In this case, at most only 25% of a write buffer rank contains data. In accordance with the present invention, a write buffer rank is fully utilized if write data having "related" addresses is posted to the write buffer.

Figures 4A, 4B:
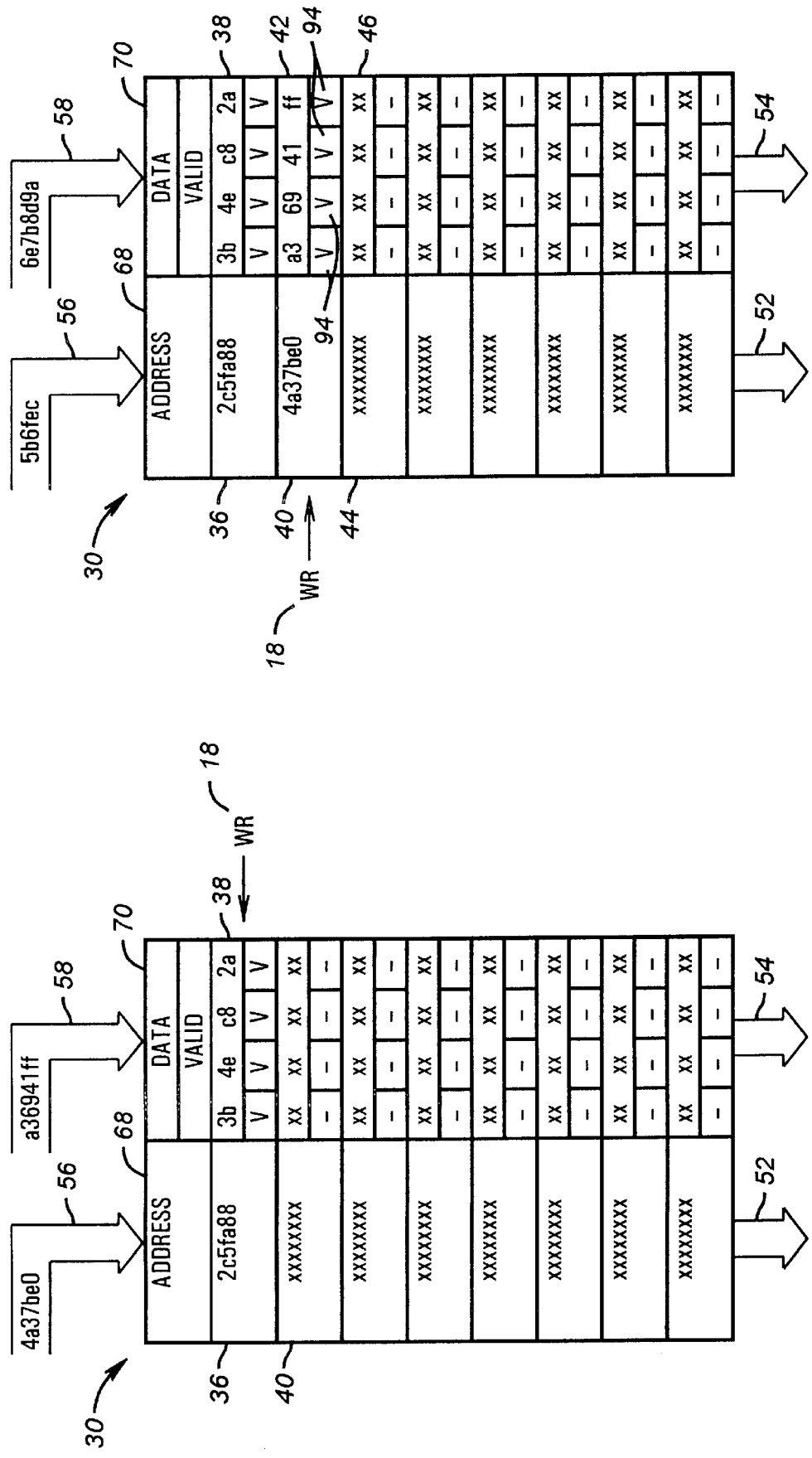
FIGS. 4A–4E are schematic illustrations depicting stages of the random access snooping write buffer of FIG. 2 for write collapsing in accordance with the present invention.

Referring to FIGS. 4A–4E, exemplary illustrations depicting stages of the random access write snooping buffer 12 showing write collapsing in accordance with the present invention are shown. Turning to FIG. 4A, an address rank 36 of the address array 68 is storing a write address '2c5fa88' and a data rank 38 of the data array 70 is storing write data '3b4ec82a'. FIG. 4a also shows the producer 10 presenting a new write address 56 of '4a37be0' to the address array 68 with new input write data 58 of 'a36941ff' to the data array

70. The write pointer 18 is pointing to the address rank 36 and the data rank 38.

Referring to FIG. 4B, a stage of the random access memory 30 a single write cycle after the stage of FIG. 4A is shown. In that write cycle, the write address '4a37be0' was written into the address rank 40, the next contiguous rank after the address rank that was pointed to by the write pointer 18 in FIG. 4A. Also, in that write cycle, the write data 'a36941ff' was written into the data rank 42, the next contiguous rank to the data rank that was pointed to by the write pointer 18 in FIG. 4A. The valid bits corresponding to write data 'a36941ff' are in a valid state. FIG. 4B also shows the producer 10 presenting a new write address 56 of '5b6fe7c' to the address array 68 with a new input write data 58 of '6e7b8d9a' to the data array 70. Before writing the write address '4a37be0' to address rank 40 and write data 'a36941ff' to data rank 42, in accordance with the present invention, the address '4a37be0' was concurrently compared to the write addresses stored in the address array 68 to detect if an address "related" to the write address '4a37be0' was present in the address array 68. Since the write address '2c5fa88' was "unrelated" to the write address '4a37be0', the CAM_HIT signal was deasserted indicating an address miss. In response to the deasserted CAM_HIT signal, the write buffer controller 16 deasserted the WR_MERGE signal. In response to the deasserted WR_MERGE signal, the write address switch 22 provided the WR_ADDR signal to the address store 32 and data store 34. The WR_ADDR signal represents the next contiguous rank address which in this case was address rank 40 and data rank 42.

Figures 4C, 4D:
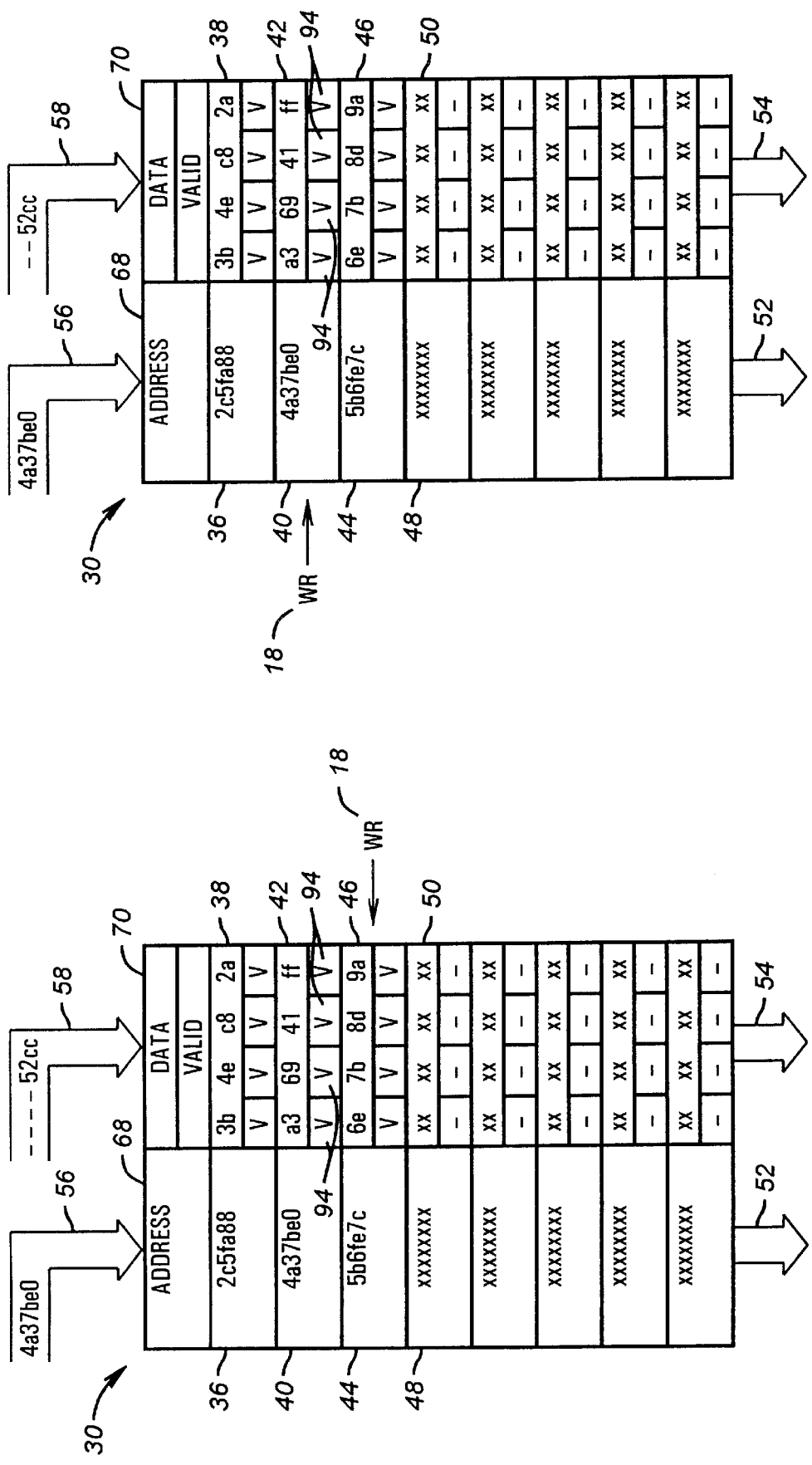

Referring to FIG. 4C, a stage of the random access memory 30 a write cycle after the stage of FIG. 4B is shown. In that write cycle, the write address '5b6fe7c' was written into address rank 44, the next contiguous rank after the address rank pointed to by the write pointer in FIG. 4B. Also, in that write cycle, the write data '6e7b8d9a' was written into data rank 46, the next contiguous rank after the data rank pointed to by the write pointer in FIG. 4B. FIG. 4C also shows the producer 10 presenting a new write address 56 of '4a37be0' to the address array 68 with new input write data 58 of ' - - - 52cc' to the data array 70. Before writing the write address '5b6fe7c' to address rank 44 and write data 'a36941ff' to data rank 42, the write address '5b6fe7c' was concurrently compared to the write addresses stored in the address array 68 to detect if an address "related" to the write address '5b6fe7c' was present in the address array 68. Since the write address '5b6fe7c' was "unrelated" to the write addresses '2c5fa89' and '4a37be0', the CAM_HIT signal was deasserted indicating an address miss. In response to the deasserted CAM_HIT signal, the write buffer controller 16 deasserted the WR_MERGE signal. In response to the deasserted WR_MERGE signal, the write address switch 22 provided the WR_ADDR signal. The WR_ADDR signal represents the next contiguous rank address which in this case was for address rank 44 and data rank 46.

Referring to FIG. 4D, a stage of the random access memory 30 following the stage of FIG. 4C is shown. In this stage, the write address '4a37be0' is concurrently compared to the write addresses stored in the address array 68 to detect if an address "related" to the write address '4a37be0' was present in the address array 68. The write address '4a37be0' is related to the write address '4a37be0' stored in the address rank 40 since the addresses are contiguous such that data for both addresses may be stored in a single rank. Since a "related" address is present in the address array 68, the CAM_HIT signal is asserted indicating an address hit or match. In response to the asserted CAM_HIT signal, the write buffer controller 16 asserts the WR_MERGE signal. In response to the WR_MERGE signal, the write address switch 22 provides the CAM_HIT_ADDR signal to the address store 32 and data store 34. The CAM_HIT_ADDR signal represents the rank address corresponding to the detected "related" address. The rank address in this case is for address rank 40 and data rank 42. The pointer 26 (output of switch 22) provides an address to any valid address rank and data rank in the snooping write buffer 12 corresponding to a write address "related" to the input write address 56 independent of the present rank pointed to by the write pointer 18. It should be understood that an "X" within the address array 68 or data array 70 represents non-existing data.

Figure 4E:
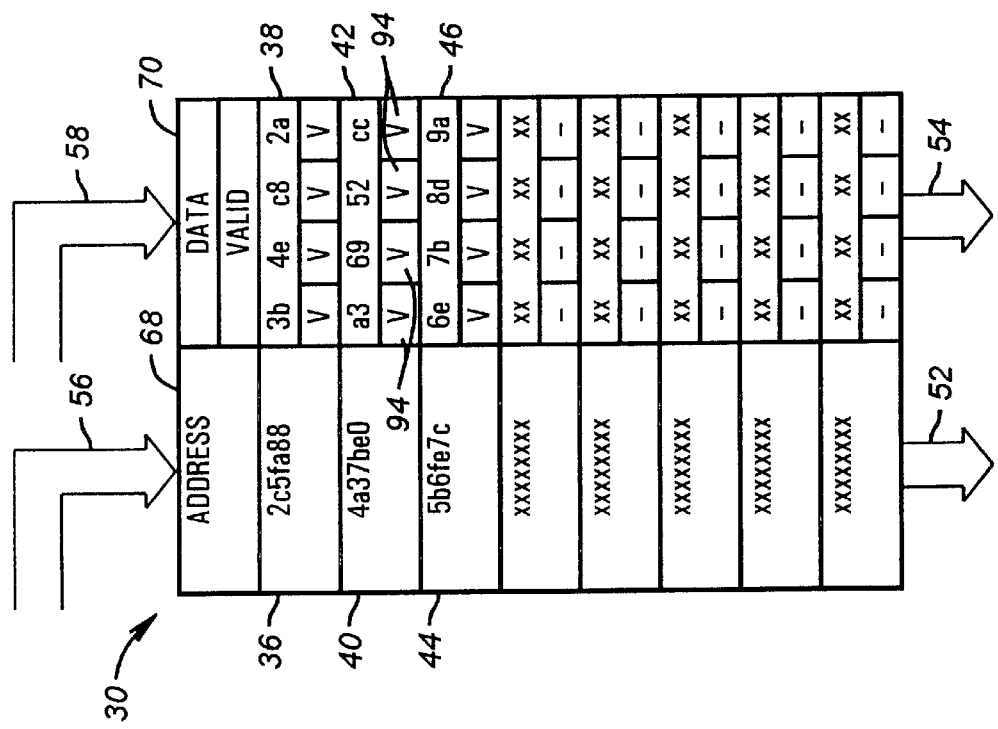

Referring to FIG. 4E, a stage of the random access memory 30 following the stage of FIG. 4D is shown. In this stage, the write address '4a37be0' is stored in address rank 40 and the write data ' - - - 52cc' is combined with the write data 'a36941ff' already stored in the data rank 42 producing the write data 'a36952cc'. Since the write data values are overlapping such that both write data values include some valid data, combining the write data values constitutes write collapsing. For this particular example, combining the addresses results in an overwrite of write data 'a36941ff' with write data 'a36952cc'. In accordance with the present invention, by write collapsing overlapping data for "related" addresses, a savings in FIFO space is achieved. The savings in FIFO space through write collapsing is a function of the number of multiple cycles used to post write data for "related" addresses as write collapsing uses a single rank rather than multiple ranks (new rank used for each write cycle) to post write data for "related" addresses. Savings in FIFO space through write collapsing may be greater than savings in FIFO space through write merging. Write collapsing, in contrast to merging, allows for incoming valid data to be written to a byte location or locations already storing valid data. It should be understood that write collapsing may result in a partial write collapse whereby one portion of valid data is written to a location storing valid data and another portion of valid data is written to a location storing invalid data. Further write collapsing, like write merging, may reduce the number of read cycles for retrieving write data for "related" addresses.

Figure 5A:
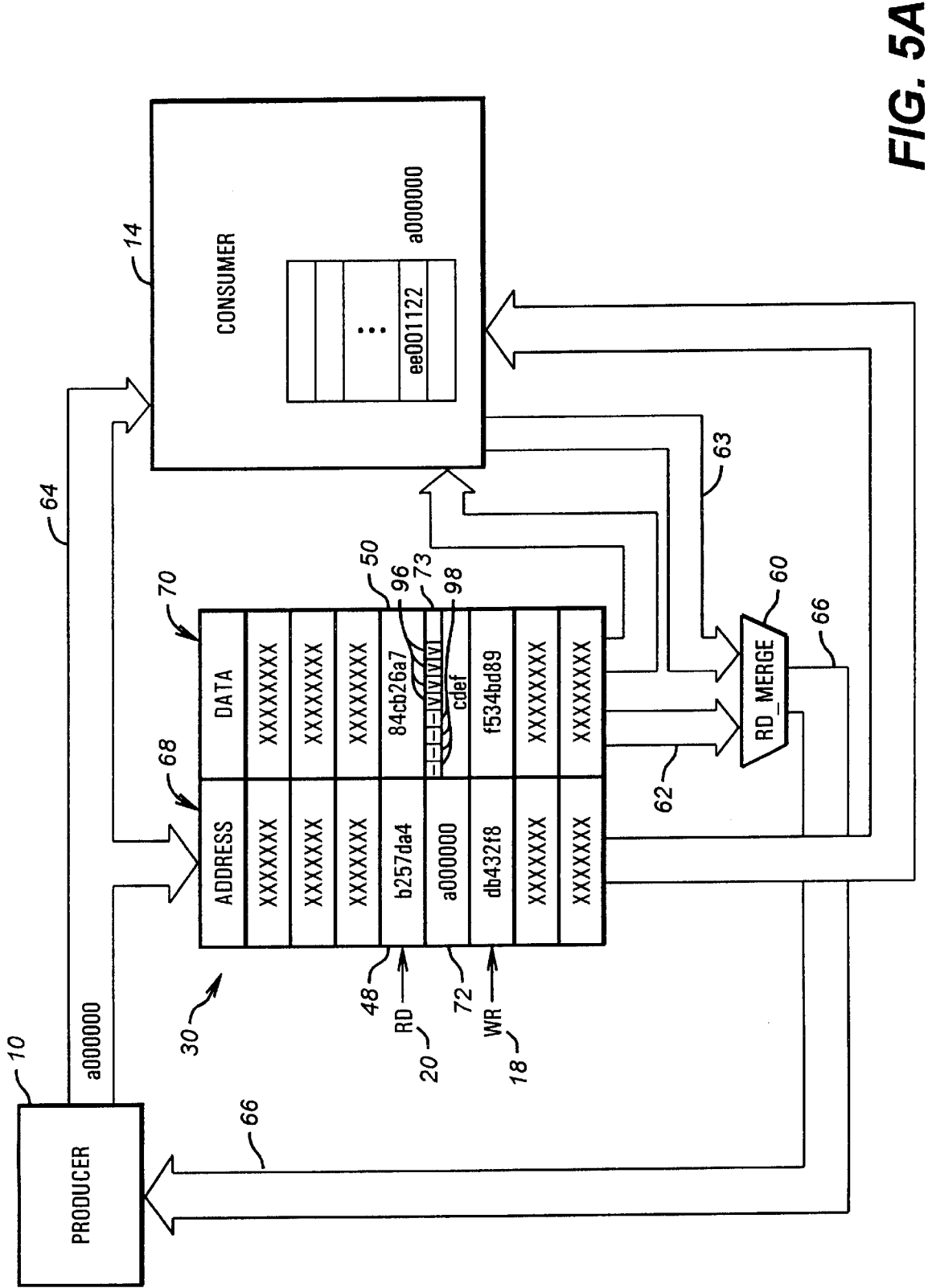
FIGS. 5A–5B are schematic illustrations depicting stages of the random access snooping write buffer of FIG. 2 for read merging in accordance with the present invention.
Figure 5B:
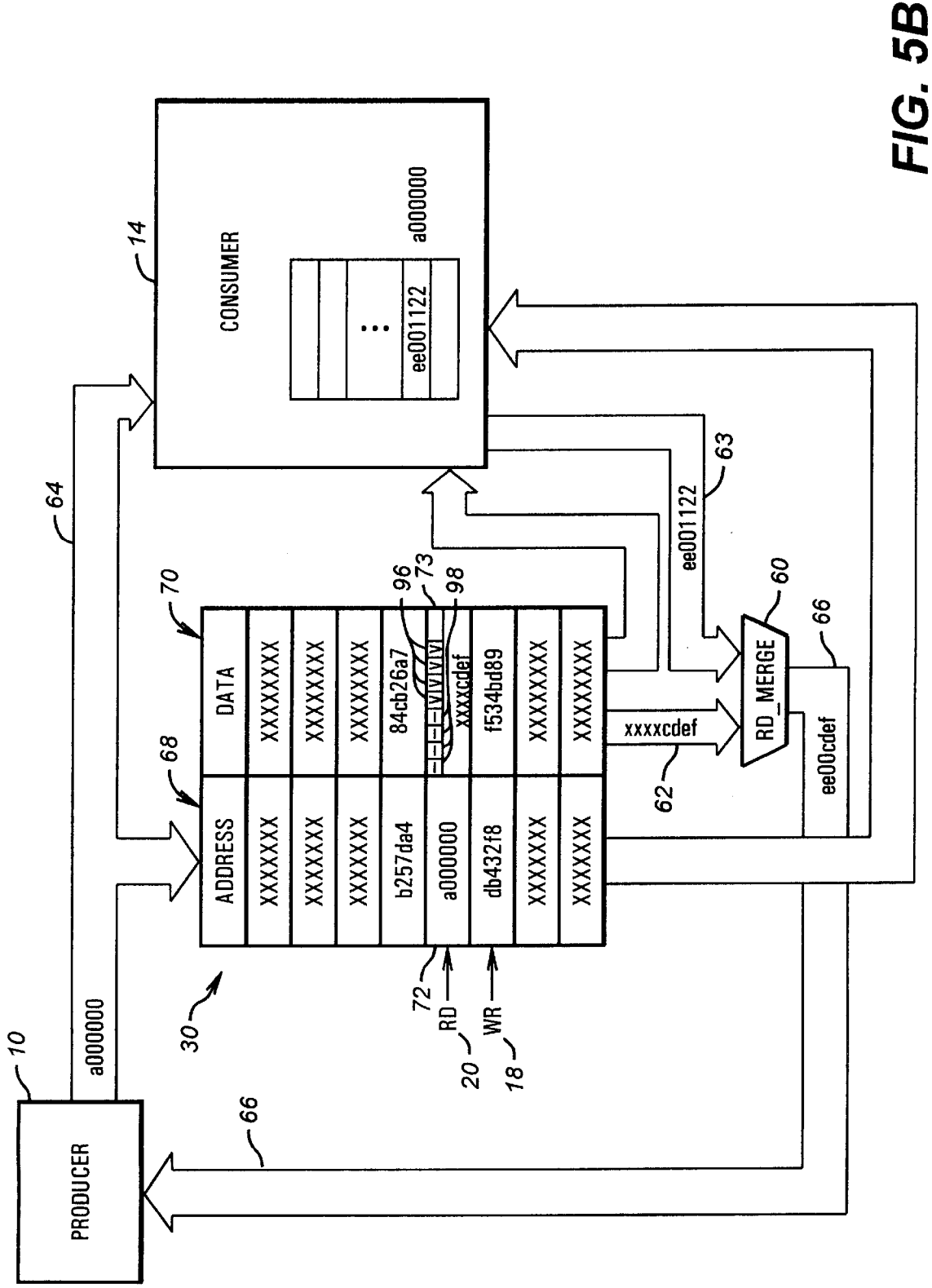

Referring to FIGS. 5A–5B, exemplary illustrations depicting stages of the random access snooping write buffer 12 showing read merging in accordance with the present invention is shown. Turning to FIG. 5A, an input read address 64 is provided to the address array 68 and the consumer 14 by the producer 10. The input read address 64 is provided to the consumer 14 to read data in the consumer 14 corresponding to the input read address 64. For this particular example, the input write address is 'a000000'. The data stored at this address in the consumer 14 is 'ee001122'. In accordance with the present invention, the input read address 64 is also provided to the address array 68 for concurrent comparison to the write addresses stored in the address array 68. By concurrently comparing the input read address 64 to write addresses in the address array 68, any address in the address array 68 "related" to the input read address 64 may be detected. The write address 'a000000' stored in rank 72 is "related" to the input read address 'a000000'. Since a related address is present in the address array 68, the CAM_HIT signal is asserted indicating an address hit (FIG. 2). In response to the asserted CAM_HIT signal, the write buffer controller 16 asserts the RD_MERGE signal. In response to the RD_MERGE signal, the read address switch 24 provides the CAM_HIT_

ADDR signal to the address store 32 and data store 34. The CAM_HIT_ADDR signal represents the rank address corresponding to the detected "related" address which in this case is for address rank 72 and data rank 73. The pointer 28 (output of switch 24) provides an address to the address store 32 and data store 34 of any valid address rank and data rank in the snooping work buffer 12 corresponding to a read address "related" to the input read address independent of the present rank pointed to by the read pointer 20.

Referring to FIG. 5B, a stage of the snooping write buffer 12 following the stage of FIG. 5A is shown. Data rank 73 stores the write data 'xxxxcdef.' The two least significant bytes, 'cdef', of the write data corresponds to valid data as indicated by valid bits 96 having a valid state. The two most significant bytes, 'xxxx,' of the write data corresponds to invalid data as indicated by valid bits 98 having an invalid state. The write data 'xxxxcdef' is provided from the data array 70 to a read merge generator 60 as a RD_OUT_ADDRESS signal 62. The read merge generator 60 also receives read data 63 for the address 'a000000' from the consumer 14. The read merge generator 60 performs a read merge operation by combining read data 63 from the consumer 14 with a valid portion read data 62 from the data store 70 when the address store 68 includes an address "related" to the input read address 64. For the illustrated example, the valid portion of read data 62 from the data store, 'cdef,' replaces the corresponding portion of read data 63 from the consumer 14, '1122'. The read merge generator 60 thus filters out any invalid portion of read data 62 and any portion of read data 63 corresponding to a valid portion of read data 62. In the disclosed embodiment, the read merge generator 60 is implemented as a multiplexer.

For a conventional write buffer FIFO, it has been necessary to flush a write buffer FIFO to retrieve FIFO data associated with an input read address and thereby maintain coherency. In accordance with the present invention, however, coherency is maintained through a read merge operation. Read merging in accordance with the present invention also eliminates the need to write out the entire write buffer contents to the consumer 14 before the rank may be read by the producer 10.

It should be understood that the write data, write addresses, and read data described in the above examples are illustrative. Further, while each illustrated data rank is shown with a four byte, or double word, size, it should be understood that the number and size of ranks provided for the data array 68 and the address array 70 and the size of write data and write addresses may vary for the snooping write buffer 12 of the present invention. In addition, it is contemplated that write merging, write collapsing, and read merging as described above may be provided as a basic or enhanced mode of a write buffer. It is further contemplated that the write buffer of present invention may have a disable mode preventing write buffering, an enable mode allowing general write buffering, and an enhanced enable mode for write buffering supporting write merging, write collapsing, and read merging as described above. Further, it should be understood that in certain situations such as when there is an address hit to a non-bufferable region of a consumer, write merging and read merging may not be desirable. Lastly, it should be understood that the snooping write buffer 12 may be implemented as a synchronous or asynchronous write buffer.

The present invention thus provides a write buffer 12 with random access memory snooping capability supporting write merging, write collapsing, and read merging. The disclosed write buffer embodiment 12 includes a write buffer controller 16 and a random access memory 30 containing a content addressable memory address store 32 and a random access memory data store 34. A producer 10 provides the address store 32 with an input write address 56 and input write data 58. The CAM 32 concurrently compares the input write address 56 to the addresses present in the address store 32. If the input write address 56 is "related" to an address present in the address store 32, the CAM 32 detects an address hit. The indication of an address hit is provided to the write buffer controller 16 which signals the data store 34 to store the input write data in the rank of the data store 34 associated with the "related" address detected by the controller 16. If the input write data 58 does not overlap the data previously stored in the rank associated with the "related" address, the store operation results in write merging. If the input write data 58 overlaps the data previously stored in the rank associated with the rank associated with the "related" address, the store operation results in write collapsing. The write buffer 12 thus eliminates the need to allocate a new rank to store write data when an input write address 56 is "related" to an address present in the address store 32. By storing write data for "related" addresses in a single rank rather than multiple ranks, the write buffer 12 provides for efficient storage of write data for "related" addresses. By eliminating the use of multiple ranks for storing write data for "related" addresses, the write buffer 12 also reduces the number of read cycles for retrieving write data for "related" addresses.

In addition, the CAM 32 detects whether an input read address 64 provided by a producer 10 to a consumer 14 is "related" to any address in the address store 32. If the input read address 64 is "related" to an address present in the address store 32, the write data in the data store 34 associated with the "related" address is merged with valid and invalid read data from the consumer 14 associated with the input read address, thereby resulting in read merging. The merged data preserves read data coherency by reflecting the most recent write data in the write buffer 12 and the valid read data in the consumer 14. Read merging for data having "related" addresses using a write buffer in accordance with the present invention also eliminates the need to flush a write buffer to maintain coherency, resulting in an increased performance response for such a read cycle. A buffer 12 with random access snooping capability thus significantly improves the method of posting and retrieving data for a write buffer by supporting write merging, write collapsing, and read merging.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A buffer coupled to an input bus on which address/data pairs and read requests are received, the buffer temporarily storing the address/data pairs and then writing the stored address/data pairs to an output bus, the buffer comprising:

a dual-ported random access memory configured as a circular queue, First-In-First-Out (FIFO) buffer having a plurality of ranks for storing address/data pairs received from the input bus, the ranks having address locations associated therewith, each address/data pair having an address portion and a data portion;

a write pointer to provide an available write address location at which a new address/data pair received from the input bus can be stored;

a read pointer to provide an available read address location from which a stored address/data pair can be written to the output bus;

a matching circuit to compare the address portion of a new address/data pair and an address portion of a read request received on the input bus to all stored address portions, the match circuit providing a hit indication comprising a matched address location if the received address portion matches one of the stored address portions;

a write switch to direct the new address/data pair to a write address location in the FIFO buffer, the write address location corresponding to the matched address location in response to the hit indication, else corresponding to the available write address location, wherein, if directed to the matched address location, the data portion of the new address/data pair is combined with the stored data portion at the matched address location;

a read switch to provide a read address location in the FIFO buffer from which to read the stored address/data pair, the read address location corresponding to the matched address location in response to the hit indication and the receipt of a read request, else corresponding to the available read address location; and a latch circuit to hold the stored address/data pair read from the read address location before writing the stored address/data pair to the output bus to prevent stalling of storage of a new address/data pair when the read address location is the same as the write address location.

2. The buffer as recited in claim 1, wherein the dual-ported random access memory comprises a dual-ported content addressable memory to store the address portions of the address/data pairs and a dual-ported randomly accessible memory data store to store the data portions of the address/data pairs.

3. The buffer as recited in claim 2, wherein the dual-ported content addressable memory comprises the matching circuit.

4. The buffer as recited in claim 1, wherein the dual-ported random access memory is configured such that the new address/data pair is stored at a first address location while a stored address/data pair simultaneously is written from a second address location.

5. The buffer as recited in claim 1, wherein the dual-ported random access memory comprises a plurality of byte enable bits associated with bytes of the stored data portions, each byte enable bit indicating the validity of each byte of the stored data portions, wherein, when a new data portion is combined with a stored data portion, one or more byte enable bits are updated to indicate the validity of associated bytes of the new data portion.

6. The buffer as recited in claim 5, wherein the new data portion is merged with the stored data portion at the matched address location.

7. The buffer as recited in claim 5, wherein the new data portion is collapsed with the stored data portion at the matched address location.

8. A system having a read/write buffer, the system comprising:

a producer that transmits write address/data pairs and read requests;

a consumer that receives the write address/data pairs and the read requests; and at least one read/write buffer coupled to the producer and to the consumer, the read/write buffer being configured to receive the write address/data pairs and the read requests via an input bus and to the to transmit write address/data pairs via an output bus, the read/write buffer comprising:

a dual-ported random access memory configured as a circular queue, First-In-First-Out (FIFO) buffer having a plurality of ranks for storing the address/data pairs, the ranks having address locations associated therewith, each address/data pair having an address portion and a data portion;

a write pointer to provide an available write address location at which a new address/data pair received from the input bus can be stored;

a read pointer to provide an available read address location from which a stored address/data pair can be written to the output bus;

a matching circuit to compare the address portion of a new address/data pair and an address portion of a read request received on the input bus to all stored address portions, the match circuit providing a hit indication comprising a matched address location if the received address portion matches one of the stored address portions;

a write switch to direct the new address/data pair to a write address location in the FIFO buffer, the write address location corresponding to the matched address location in response to the hit indication, else corresponding to the available write address location, wherein, if directed to the matched address location, the data portion of the new address/data pair is combined with the stored data portion at the matched address location;

a read switch to provide a read address location in the FIFO buffer from which to read the stored address/data pair, the read address location corresponding to the matched address location in response to the hit indication and the receipt of a read request, else corresponding to the available read address location; and a latch circuit to hold the stored address/data pair read from the read address location before writing the stored address/data pair to the output bus to prevent stalling of storage of a new address/data pair when the read address location is the same as the write address location.

9. The system as recited in claim 8, comprising:

a read merge circuit coupled to the producer, the consumer and the read/write buffer, wherein, in response to the hit indication, the read merge circuit merges write data stored in the read/write buffer at a data location corresponding to the matched address location with read data from the consumer corresponding to the read address received on the input bus.

10. The system as recited in claim 9, wherein the dual-ported random access memory comprises a plurality of byte enable bits associated with bytes of the stored data portions, each byte enable bit indicating validity of each byte of the stored data portions, wherein, when a new data portion is combined with a stored data portion, one or more byte enable bits are updated to indicate the validity of associated bytes of the new data portion.

11. The system as recited in claim 10, wherein the read merge circuit filters out invalid bytes of the stored data portion based on the associated byte enable bits.

12. The system as recited in claim 8, wherein the dual-ported random access memory comprises a dual-ported content addressable memory to store the address portions of the address/data pairs and a dual-ported randomly accessible memory data store to store the data portion of the address/data pairs.

13. The system as recited in claim 12, wherein the dual-ported content addressable memory comprises the matching circuit.

14. The system as recited in claim 8, wherein the new data portion is merged with the stored data portion at the matched address location.

15. The system as recited in claim 8, wherein the new data portion is collapsed with the stored data portion at the matched address location.

16. A method of combining write data received from a producer with stored write data stored in a write buffer, the write data being associated with a write address received from the producer, and the write buffer having a plurality of data locations for storing write data and a plurality of address location for storing write addresses, each data location corresponding to an address location, the method comprising:

pointing to an available address location in the write buffer for storing a received write address from the producer;

detecting whether the received write address is related to a stored write address in the write buffer;

generating a hit indication if the write address is related to a stored write address, the hit indication comprising a related address location corresponding to the address location of the related stored write address;

if the hit indication is generated, switching the available address location to the related address location in response to the hit indication and storing the write data associated with the received write address in the data location corresponding to the related address location;

else, if the hit indication is not generated, storing the write data associated with the received write address in the data location corresponding to the available address location; and setting a plurality of byte enable bits in the write buffer, each byte enable bit corresponding to a byte of stored write data, each set byte enable bit representing validity of the corresponding stored write data byte.

17. The method as recited in claim 16, wherein storing the write data in the data location corresponding to the related address location comprises combining one or more valid bytes of the write data with one or more valid bytes of old write data previously stored in the related address location.

18. The method as recited in claim 17, wherein combining valid bytes fo the write data comprises overwriting a valid byte of the old write data with a valid byte of the write data.

19. A method of merging write data stored in one of a plurality of data locations in a read/write buffer with write data stored in one of a plurality of memory locations of a memory device coupled to the read/write buffer, each data location in the read/write buffer corresponding to an address location in the read/write buffer, the method comprising:

receiving data/address pairs, each data/address pair including write data and a write address;

storing each write address at an address location in the read/write buffer;

storing each write data at a data location in the read/write buffer, each data location corresponding to a respective address location;

setting a plurality of byte enable bits in the read/write buffer to indicate validity of each byte of the write data stored at the data locations;

pointing to an available address location in the read/write buffer corresponding to a data location from which stored write data can be written to the memory device;

receiving a read data request including a read address;

comparing the read address to all stored write addresses in the read/write buffer;

generating a hit indication if one of the stored write addresses is related to the read address, the hit indication comprising the address location of the related stored write address;

switching the available address location to the related stored write address location in response to the hit indication;

retrieving the write data from only the data location corresponding to the related stored write address location;

filtering out invalid bytes of the retrieved write data based on the corresponding byte enable bits; and merging the remaining valid bytes of the retrieved write data with write data retrieved from a memory location in the memory device corresponding to the read address.

20. The method as recited in claim 19, wherein merging the retrieved write data comprises replacing an invalid byte of write data from the memory device with a valid byte of the retrieved write data from the related stored write address location in the read/write buffer.

* * * * *